Sept. 13, 1932.   M. J. GOLDBERG   1,877,297
CLUTCH AND TRANSMISSION MECHANISM
Filed Aug. 21, 1929   2 Sheets-Sheet 2

INVENTOR
MORRIS J. GOLDBERG
BY
ATTORNEY

Patented Sept. 13, 1932

1,877,297

UNITED STATES PATENT OFFICE

MORRIS J. GOLDBERG, OF BELOIT, WISCONSIN, ASSIGNOR TO FAIRBANKS, MORSE & CO., OF CHICAGO, ILLINOIS, A CORPORATION OF ILLINOIS

CLUTCH AND TRANSMISSION MECHANISM

Application filed August 21, 1929. Serial No. 387,349.

This invention relates to improvements in clutch and transmission mechanism, and particularly to gearing and clutch control means for internal combustion engines, and the like.

An object of the present invention is to provide simple and effective means for controlling, by a single lever, in selective sequences, the operation of a plurality of clutches in a power transmission device.

A further object is to provide an improved unified control means for a main and an auxiliary clutch, and to provide a separate individual control lever for a slow speed clutch which includes means, when the slow speed clutch is engaged, for preventing the engagement of the auxiliary clutch, but permitting the complete actuation of the main clutch for driving purposes.

Figure 1:
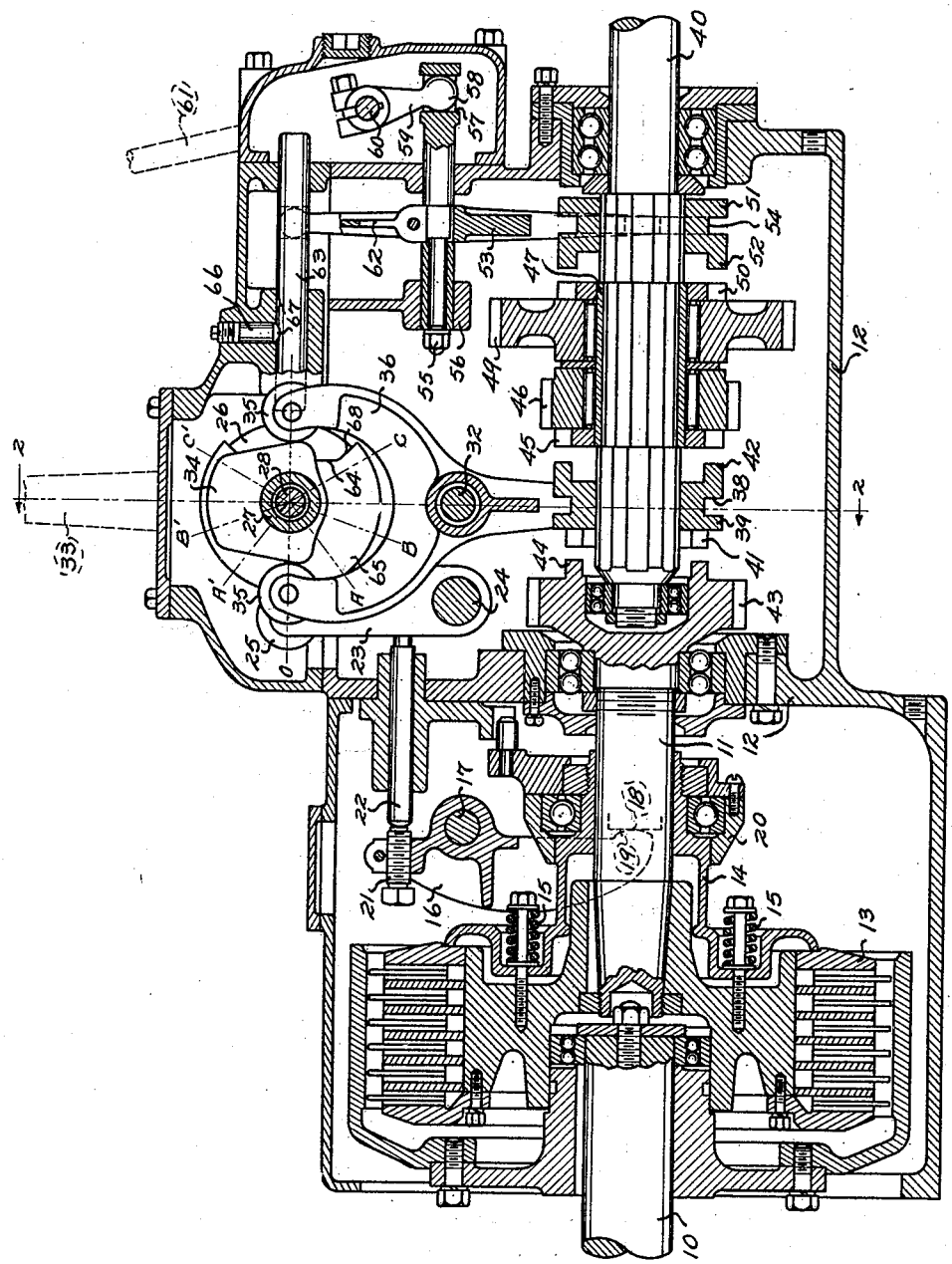
Figure 2:
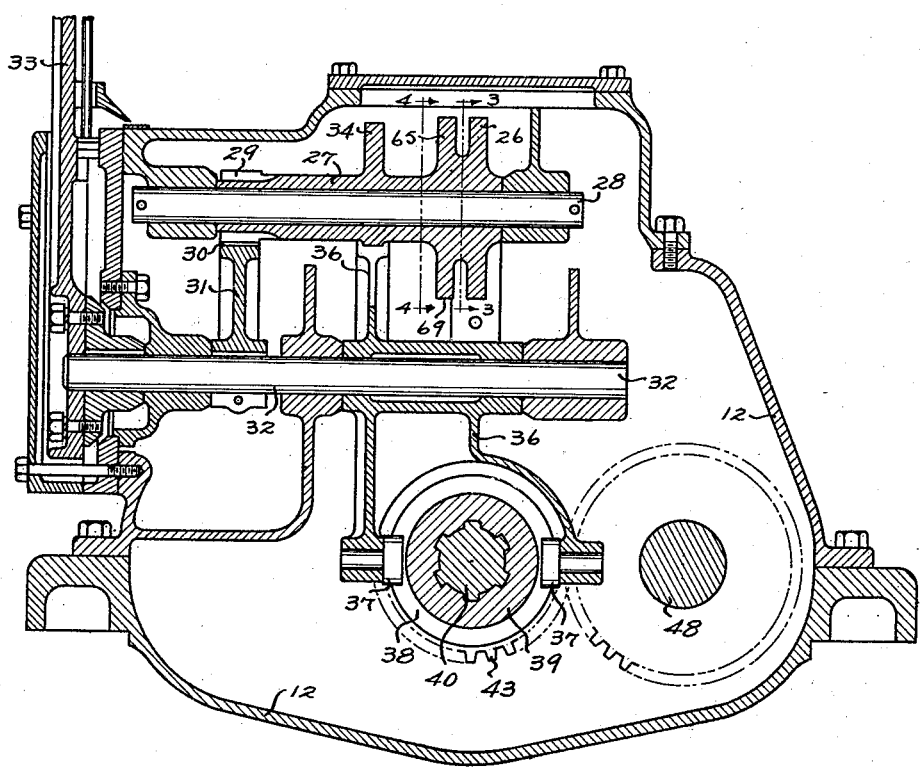
Figure 3:
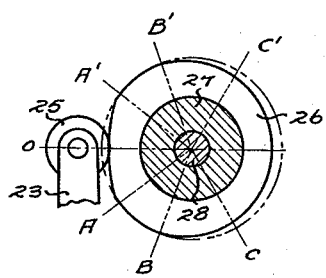
Figure 4:
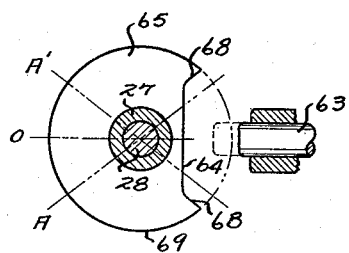

Further objects and advantages of the invention will appear from the following detailed description of parts and the accompanying drawings, in which Fig. 1 is a longitudinal section of a clutch and transmission mechanism, to which the improvements are applied; Fig. 2 is a sectional elevation taken along line 2—2 of Fig. 1; Fig. 3 is a fragmentary sectional elevation taken along line 3—3 of Fig. 2, and Fig. 4 is a fragmentary sectional elevation taken along line 4—4 of Fig. 2.

It will, of course, be understood that the present detailed description of parts and the accompanying drawings relate to a single preferred executional embodiment of the invention, and that substantial changes may be made in the described arrangement and construction of parts without departing from the spirit and full intended scope of the disclosure as defined by the appended claims.

Referring by numerals to the drawings, 10 indicates an extended portion of a driven shaft, which may consist, for example, of a part of a crank shaft of an internal combustion engine, or a driving or driven shaft of any other suitable power device. A transmission shaft 11 is supported in bearings provided in a casing 12, which serves as a housing for the assembly. The shaft 11 is arranged to be driven by the shaft 10, by means of a clutch 13 of any suitable type, presently shown as a friction clutch of disc type. In the preferred illustrated example, the clutch 13 is actuated by a member 14 which is mounted to slide freely upon the shaft 11. The member 14 is normally held by means of springs 15, in clutch engaging position. A lever 16 is pivoted on a pin 17, fixedly supported in the casing 12. End portions 18 of this lever impinge upon oppositely disposed lugs 19 provided on a non-rotatable collar 20 which is mounted for sliding movement along with the member 14. It will be quite evident that movement of the lever 16 tends to move the member 14 along the shaft 11, to engage or disengage the clutch 13; and that movement of the member 14 and its related parts to the right as viewed in Fig. 1, tends to disengage the clutch. However, this movement is opposed by the tension of the springs 15. By this provision, it will be apparent that the ends 18 of the lever 16 are maintained during all operations in contact with the lugs 19 for a purpose hereinafter appearing.

In the preferred example, the lever 16 is provided with a threadedly adjustable stud 21, which is positioned to impinge upon an end of a slide bar 22 supported to slide freely in bearing portions of the casing 12. The opposite end of the bar 22, bears against a portion of a lever 23 which is pivoted on a pin 24 fixedly secured to the casing 12. The lever 23 is provided at its outer or free extremity with a roller 25, which bears against the camming surface of a cam member 26. This cam may be formed integrally with, or secured to a control sleeve 27 which is rotatably mounted on a shaft 28 supported in bearings formed in the casing. It will be readily seen that the roller 25 is maintained in close contact with the cam surface of the cam 26, by means of the spring tension acting through the member 14 and its related actuating members. Therefore, the movement of the member 14 is entirely controlled by the above described cam surface upon a rotary movement of the cam 26 about the shaft 28.

The sleeve 27 is provided with a pinion 29, (Fig. 2) formed on or carried by the sleeve, and which is arranged to mesh with a gear segment 30 formed on an arm 31 which is in turn securely attached to a shaft 32 supported by the casing 12. A hand lever 33 is keyed to the shaft 32, and through the above described arrangement permits rotation of the cam 26. It will be apparent from the gear ratio of members 29 and 30, that slight angular movement of the shaft 32 by means of the lever 33, produces a correspondingly greater angular movement of the sleeve 27, for a purpose hereinafter appearing. By the provision described, as the lever 33 is moved uni-directionally from its central or mid-position, to a limit of its movement, the greater movement of sleeve 27 and hence cam 26, will serve to actuate the clutch, in the example shown, in and out of engagement, in a certain sequence determined by the shape of cam 26. This predetermined sequence of clutch movements is in timed relation to other events, controlled through the movements of lever 33 and sleeve 27, as will hereinafter clearly appear.

Fixedly secured to or formed on the sleeve 27 is a cam 34 which is arranged to rotate between rollers 35 which are supported in end portions of a bifurcated lever 36, pivoted and freely rotatable upon the shaft 32. The cam 34 is rotated by means of the described geared connection between the sleeve 27 and the shaft 32. Rollers 37 (Fig. 2) are provided on lower, forked portions of the lever 36, and are arranged to ride in an annular groove 38 formed on a collar 39 which is splined to, and slidable along a shaft 40, (Fig. 1). It will be readily seen that rotation of the cam 34 by means of the lever 33 produces a rocking movement of the lever 36 about the shaft 32 to move the collar 39 along the shaft 40 for a purpose hereinafter appearing. The collar 39 is provided with oppositely disposed jaw clutch elements 41 and 42, (Fig. 1). Transmission shaft 11 is provided with a gear 43 on which is formed or securely attached a jaw clutch element 44. Actuation of the cam 34 to move the lever 36 and collar 39 along the shaft to the left, as viewed in Fig. 1, causes the jaw clutch 41 on the collar 39 to engage the clutch 44 on the gear 43, and thereby to clutch the shaft 11 to the shaft 40. This position of the clutches enables the shaft 40 to be driven in the same direction of rotation as the drive shaft 10 of the prime mover. However, when the collar 39 is moved to the right as viewed in Fig. 1, the clutch 42 on the collar 39 engages a similarly formed jaw clutch 45 secured to a reverse gear 46, which is mounted to rotate freely on a sleeve 47 splined to the shaft 40. When the gear 46 is clutched to the shaft 40, this shaft is rotatable in a reverse direction by means of gears mounted on a parallel shaft 48 (Fig. 2), and meshing with gears 43 and 46. The arrangement of this portion of the assembly may correspond to that of the usual automotive transmission, and by preference includes a reverse idler gear (not shown) whereby the gear 46 may be driven in a reverse direction to shaft 11.

A low speed gear 49 is mounted to rotate freely upon the sleeve 47, and is provided with a jaw clutch element 50. This gear is arranged to mesh with a gear (not shown) keyed to the shaft 48. A member 51 is splined to, but slidable along the shaft 40, and is provided with a jaw clutch element 52. Movement of the member 51 along the shaft 40 is controlled by means of a lever 53, a portion of which engages an annular groove 54 formed on the member 51. The lever 53 is securely attached to a slide bar 55 which is supported to move freely in bearings 56 formed in the casing. A slotted portion 57 of the bar 55 receives a ball end 58 of a lever 59 which is securely fixed to a shaft 60 supported in a stationary portion of the casing. The lever 59 is actuated by a hand lever 61 keyed to the shaft 60. It will be apparent that the slow speed clutch member 52 is controlled by the movement of the hand lever 61.

An extended portion 62 of the lever 53 is in socketed connection with a slide member 63 mounted to reciprocate freely in bearings in the casing. This slide member is movable with the lever 53 under the control of the lever 61. It will be apparent that when the lever 53 is moved to the left as viewed in Fig. 1, the clutch 52 on the member 51 engages the clutch 50 on the slow speed gear 49. At the same time, the bar member 63 moves to a position shown in dotted lines in Fig. 4. In this position the member 63 is disposed in a slotted portion 64 formed on a cam 65 which may be formed on or attached to the control sleeve 27. A spring pressed plunger 66 is mounted in the casing and coacts with notched portions 67 formed on the member 63 to prevent casual or accidental movement of this member.

Certain operating advantages of the described mechanism will be apparent from the above constructional features. In the present device, it will be readily seen that the transmission gears are always operatively meshed or engaged, and that, therefore, no sliding or shifting of the gears is necessary. It will be readily seen that the control cams 26, 34 and 65 are mounted for rotary movement together with the sleeve 27 serving as a carrier for these cams, and therefore to correlate the various movements incident to the operations of the main and auxiliary clutch mechanism. As appearing in Figs. 1, 3 and 4, each cam is provided with camming surfaces that will provide the proper movement of the related levers. When the cams are rotated by the lever 33 to the positions A or A', as indicated in dotted lines in Figs. 1, 3 and 4, the main clutch 13 is disengaged and the remaining controls are in neutral or rest position. In these positions of the cams, the slow speed clutch 52 may be moved, by means of the independent control lever 61, to the left as viewed in Fig. 1 to engage the clutch portion 50 provided on the low speed gear 49. This movement causes the bar 63 to ride into the slot 64 formed on the cam 65, as shown in dotted lines in Fig. 4. The rotation of the sleeve 27 and the cams carried thereby, by the hand lever 33, is limited by the angular extent of the slot 64 on the cam 65, due to the edges 68 of the slot impinging upon the bar member 63. But the length of this slot is so determined that the cams may be rotated to points between A and A'. For instance when the cams are rotated to the position O, the main clutch 13 is engaged due to the low point formed on the cam 26. This clutch engagement permits the shaft 40 to be driven at low speed from the shaft 10. However, as will best be seen in Fig. 1, the cam 34 has not been moved sufficiently to permit engagement of the auxiliary clutches, identified with portions 41 and 42. By this provision, the main clutch 13 may be engaged for driving purposes, when the slow speed clutch is engaged; but the auxiliary clutches, such as full speed forward and reverse are locked out of engagement, so that they are inoperative for the time being. With the parts of the assembly in the relation described, the shaft 40 will be rotated at a relatively reduced speed by the power shaft 10, acting through engaged clutch 13, driving shaft 11, and hence gear 43. This gear in turn drives shaft 48 (Fig. 2) through one of the gears thereon; another take-off gear on this shaft engages the gear 49, which is in turn operatively related to shaft 40 through the engaged clutch members 50 and 52.

When the low speed clutch is disengaged by movement of the clutch 52 to the right, as viewed in Fig. 1, the bar 63 is moved beyond the slot 64 to the position shown in full lines in Fig. 4. The cam assembly on sleeve 27 then may be rotated to the positions B or B' in which one of the auxiliary clutches, such as 41 or 42 is fully engaged by its corresponding clutch element, 44 or 45. However, at these points the cam 26 is not in a position to cause the clutch 13 to be engaged, and the shaft 11, together with the related transmission shaft 3, are at rest. But when the cams are rotated to the points C or C' the clutch 13 becomes engaged. It will be readily seen that when the cams are moved to the positions A', B' and C', the reverse drive clutch 45 is engaged, and that when the cams are moved to the positions indicated by A, B and C, the direct forward drive clutch 44 is engaged. However, when the cams are rotated beyond the points A and A', the slot opening 64 on the cam 65 is moved beyond the bar 63, and further actuation of the slow speed clutch is prevented, due to the fact that the bar 63 cannot be moved to the left as seen in Fig. 4, so as to enter the slot, but impinges upon the outer surface 69 formed on the cam 65. It will be readily seen that the portion of the cam 26 between the points A and A', may be utilized for partially engaging the clutch 13, in order to shift the shaft 11 sufficiently to permit jaw clutch element 39 to be engaged.

The present invention, in its preferred embodiment, provides means establishing a sequence of actuation of a main or principal clutch, such as 13; this means being identified particularly with the cam 26. A sequence of actuation of an auxiliary clutch, such as the parts 41 and 42, is further provided, with control means therefor, including the cam 34. In addition, the cam 65 correlates the movements of a low-speed clutch member 52, with the remaining controls. Each of the three cams referred to, is mounted in fixed angular relation upon a movable carrier or sleeve 27, so that the cams are definitely timed with respect to each other. By this construction, described above in detail, the main clutch 13 is automatically disengaged when either of the portions 41 or 42 is brought toward engaging position, and the main clutch again engaged when the auxiliary clutch is in driving position. Simultaneous engagement of the reverse and normal forward running clutch elements, 42—45 and 41—44 respectively, is impossible, since the member 39 cannot span the distance between 44 and 45. It will be noted that cam 65 and plunger 63 serve to prevent simultaneous engagement of the low speed forward clutch and either the reverse or normal forward clutch elements, but serve to lock these parts in out-of-action position, except when they may be safely and properly engaged.

According to the preferred arrangement, the control-timing mechanism is entirely enclosed within the housing 12, which, as usual, may contain a quantity of lubricant which is directed by splash, onto the cam and sleeve assembly and all related control and working parts.

It will be readily understood that the above described assembly provides a unitary control for power transmission mechanisms, which is simple and durable in construction. By the use of cams as preferred, or other similar members, the sequence of operation of each clutch assembly is automatically predetermined, is definitely correlated with the cycles of actuation of the remaining controls, and the entire mechanism brought under the influence of a single lever. Further, the operation of the controls is made entirely safe and free from any element of doubt in operation, so as to prevent any disastrous results by incorrect manipulation of the controls.

I claim as my invention:

1. In a transmission, a driven shaft, a high speed driving connection, and low speed and reverse gears carried by said shaft, a friction clutch, a high speed, reverse gear- and clutch control shaft, a manual control lever operatively associated with said shaft, control connections from the control shaft to certain of said gears, including an assembly of gear- and clutch-control cams operatively and detachably carried by said control shaft, said assembly including a friction-clutch actuating cam, and a cam adapted for selectively bringing said high speed and reverse gear connections into inaction positions, in sequence with control movements of said friction clutch; a low speed control lever, a locking member operable therewith, one of said cams having a recess arranged to receive said locking member, and coacting therewith to prevent movement of the low speed lever into operative position, while said first named lever is in speed- or direction-controlling position.

2. In a transmission, a friction clutch, transmission mechanism including a reverse gear and a plurality of variable speed gears, a manual control lever, cams operable thereby for sequentially actuating said clutch, one of said speed gears, and a reverse gear; a separate manual control lever for the other of said speed gears, a cam movable responsively to one control lever, a plunger movable responsively to the other lever into motion-limiting relation to said cam, the cam and plunger constituting an interlock for preventing operative movement of said first named lever into a speed or direction controlling position, while said last named speed gear is operatively engaged.

3. In a transmission, a clutch, a plurality of gears, a manual control lever common to said clutch and one of said gears, a second manual control lever for another of said gears, and means relating the movements of said control levers for determining a sequential control actuation of said first named gear and clutch, and for preventing operative actuation of said second control lever when said first named gear is operatively engaged.

4. In a transmission including a clutch and means for effecting high speed and reverse control operations, a pair of control shafts, said shafts being arranged to coact for effecting sequential actuation of the clutch and high speed control means, and for effecting direction control, a control lever common to said shafts, adapted to permit their manual actuation, a low-speed gear, a control lever therefor, and means associated with said shafts for limiting their movement.

5. In a transmission, a clutch, a shaft driven thereby, a clutch operating sleeve on said shaft, a second shaft, means for selectively connecting said first and second shafts in high speed and reverse driving relations, a manual control member for said connecting means, a pair of cams on said member, one of said cams being operatively related to said clutch and the other to said connecting means, whereby movements of said control member actuate said clutch operating sleeve in predetermined, timed relation with respect to the actuation of said connecting means, a low-speed gear carried by said shaft, a separate lever controlling engagement of said low-speed gear with said second shaft, and means including an element carried by said control member, for keeping said low-speed gear inoperative except when the control member is in a predetermined position.

6. In a transmission, including speed-change mechanism, a friction clutch, a shaft driven thereby, an actuating member for said clutch, a control shaft, a lever for actuating said shaft, a cam operatively related to said control shaft and member, a second shaft, transmission mechanism including a high-speed drive, a low-speed gear and a reverse gear associated with said second shaft, clutch mechanism for connecting said reverse gear to said second shaft, a second cam, operatively associated with said control shaft, for co-ordinating the control movements of said reverse clutching mechanism and high speed drive, with the positions of said friction clutch, a separate lever for controlling said low speed gear, and an element carried by said control shaft for preventing operative movements of said last named lever, when said first named lever is in operative positions.

7. In a transmission, including a clutch and shifting devices, for effecting high and low speed, and reverse driving connections, said devices including a manual control shaft for effecting high speed and reversing control movements, a shifting lever associated therewith, a low speed control lever, and a unitary assembly including a plurality of cams, detachably carried by said shaft and means associating the cams and levers, said means adapted to coact with said cams sequentially to relate the movements of said levers, and of said clutch and shifting devices to prevent concurrent actuation of said levers into speed and direction control positions.

8. In a reverse gear transmission, a clutch, a shaft driven thereby, a clutch operating sleeve carried by said shaft, a second shaft, transmission mechanism associated with said second-shaft and including a reverse gear, a high-speed drive and a low speed gear, a manual control lever for operating said reverse gear, said clutch sleeve, and said high-speed drive, means including a pair of cams, each associated with said lever and adapted respectively for actuating said clutch sleeve, and for correlating the movements of said lever, to cause selective clutching engagement of said high speed drive and said reverse gear, and a separate lever for manually controlling said low speed gear.

MORRIS J. GOLDBERG.